No. 896,650. PATENTED AUG. 18, 1908.
O. H. MARX.
SULKY PLOW.
APPLICATION FILED FEB. 12, 1908.
2 SHEETS—SHEET 2.
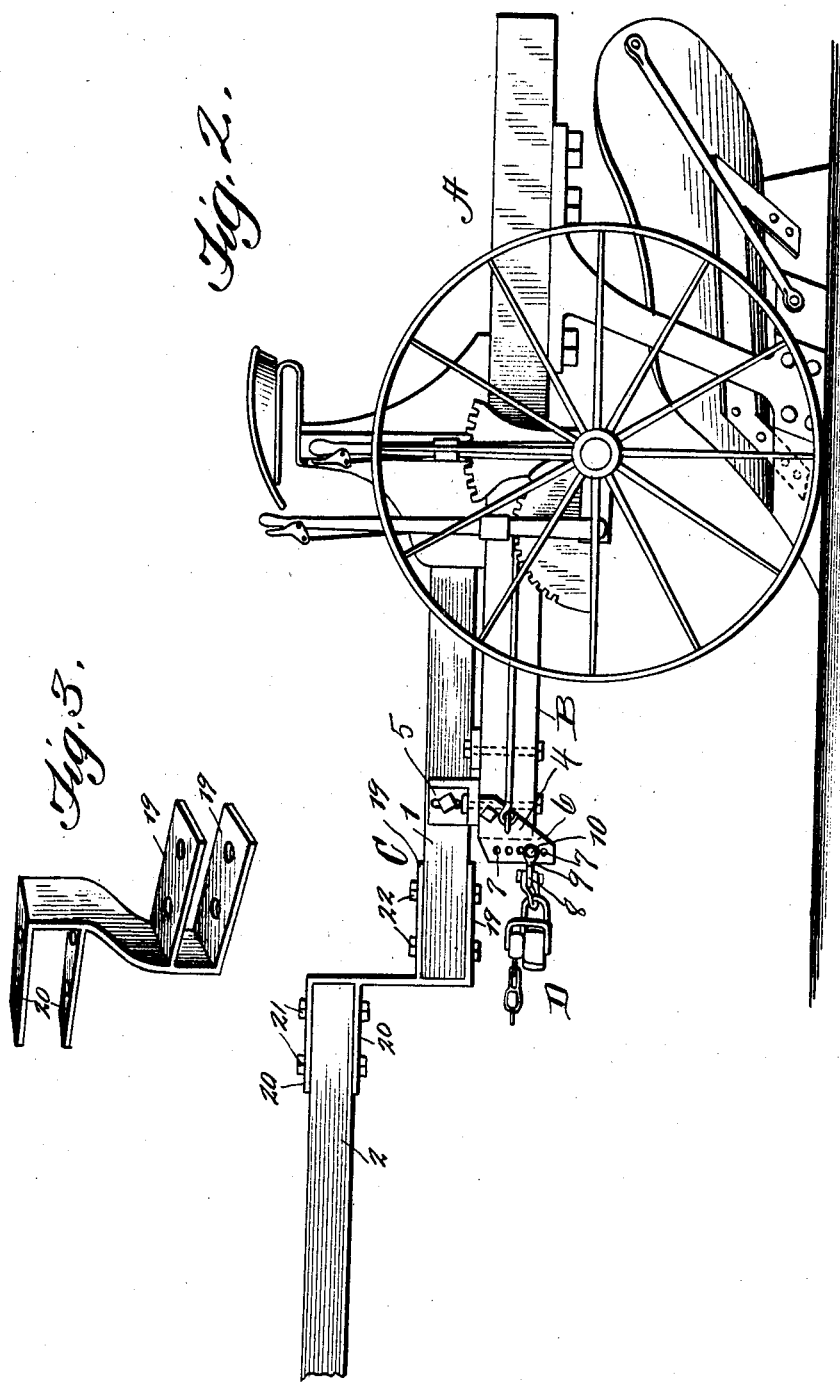
Witnesses
Elfrieda Behrens
W. J. Roach
Inventor
Otto H. Marx,
By
Emil Behrens
his Attorney

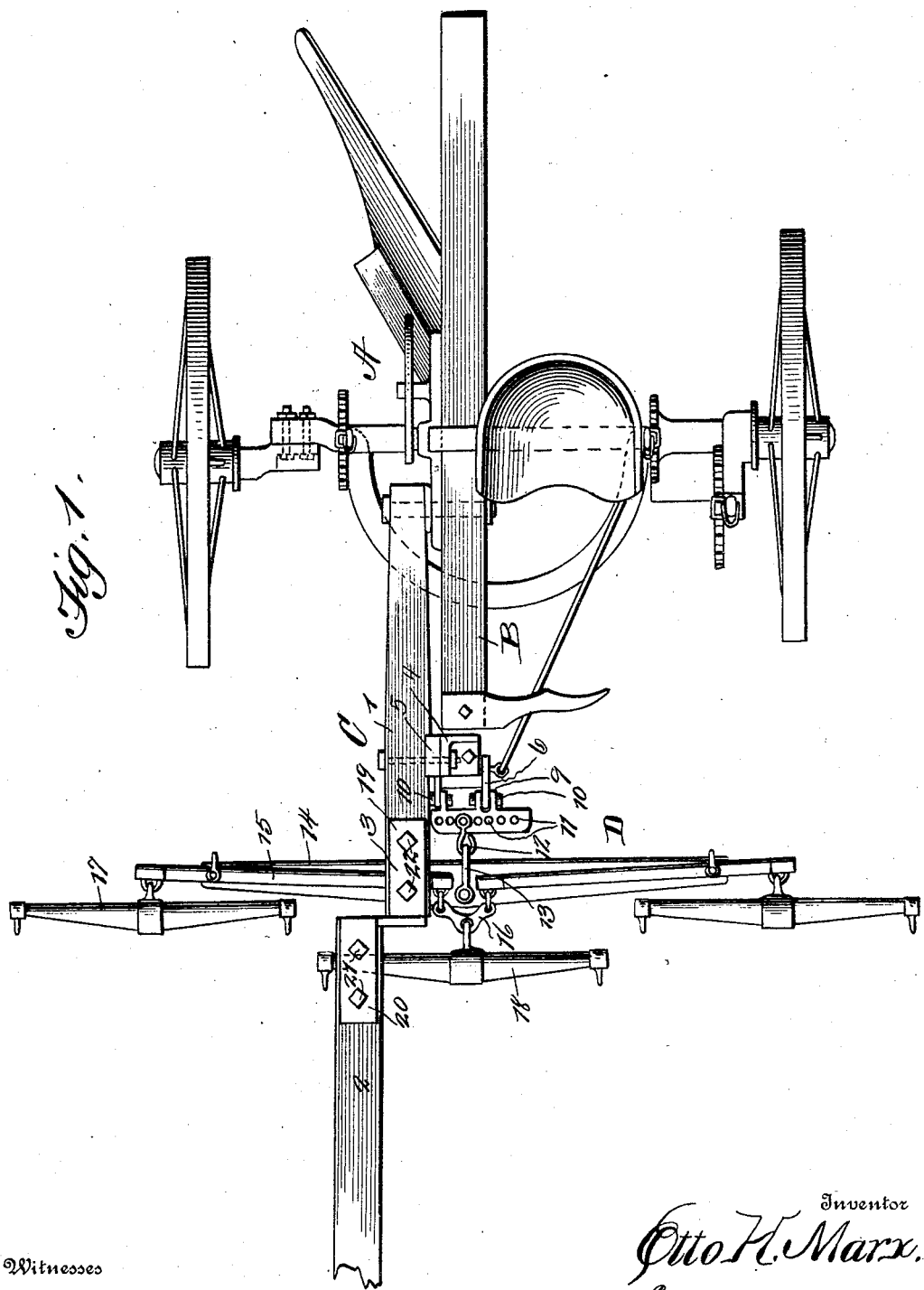

UNITED STATES PATENT OFFICE.

OTTO H. MARX, OF LAVERNIA, TEXAS.

SULKY-PLOW.

No. 896,650.  Specification of Letters Patent.  Patented Aug. 18, 1908.

Application filed February 12, 1908. Serial No. 415,613.

*To all whom it may concern:*

Be it known that I, OTTO H. MARX, a citizen of the United States, residing at Lavernia, in the county of Wilson and State of Texas, have invented certain new and useful Improvements in Sulky-Plows, of which the following is a specification.

This invention relates to new and useful improvements in draft eveners and it has more particular reference to a three-horse evener for sulky plows.

Ordinarily, in three-horse eveners in securing a straight and easy draft the central tree is in such propinquity to the central pole that the middle horse constantly rubs against the said pole. The present invention therefore contemplates as its primary object, while securing a straight and easy draft to provide a novel and inexpensive connection for offsetting the projecting portion of the pole from that part which extends longitudinally of the plow frame.

The details of construction will appear in the course of the following description, in which reference is had to the accompanying drawings forming a part of this specification, like characters of reference designating similar parts throughout the several views, wherein:—

Figure 1 is a top plan view showing an evener construction in which the present invention is embodied. Fig. 2 is a side elevation of the same, and Fig. 3 is a detailed perspective view of the connection above referred to.

A conventional sulky plow A is shown in the accompanying drawings which plow is equipped with the beam B, to which is secured the pole C, made in sections 1 and 2, the section 1 being secured to the beam B, and the section 2 being secured to the end of the section 1 by the offsetting clip 3.

The draft evener D is connected to the section 1 by a clevis 4, which includes a part 5 secured to section 1, and having its ears 6 formed with vertical series of apertures 7, and a part 8 having ears 9, adjustably secured to the ears 6 by pins 10 engaged through the apertures 7. The part 8, disposed in a horizontal plane has a series of apertures 11, to allow of the adjustable connection therewith of a coupling hook 12 which engages a rearwardly extending loop 13 carried centrally of a main evener beam 14. From the ends of the beam 14, auxiliary evener beams 15 are pivotally hung, the connections of the beams 15 being closely adjacent to the outer ends of the latter. The inner ends of the beams 15 are connected by a one-piece clip 16, which is pivoted to said inner ends so as to allow of the beams 15 having the necessary play in evening the draft. Swingle trees 17 are pivotally hung from the outer ends of the beams 15, and a centrally located swingle tree 18 is hung from the clip 16.

The clip 3, in order to offset the section 2 from the section 1 has its body portion extended along a diagonal axis and at its lower end is formed with a pair of rearwardly extending spaced lugs 19 and at its upper end with a pair of forwardly extending spaced lugs 20. The ends of the sections 1 and 2 are received between the respective lugs 19 and 20 and are fastened in this relation by bolt and nut fastenings 21 and 22. It will thus be seen that the diagonal form of the body of the clip offsets the section 2 above and at one side of the section 1 so that the same is closely adjacent one end of the tree 18 and at a material distance from the center thereof. Hence, all liability of the central horse rubbing against section 2 which carries the neck yoke centers, is positively eliminated.

The invention is simple in its structural details, inexpensive to manufacture and practical and efficient in use.

Having fully described my invention I claim:—

1. In a wheeled structure in combination with a beam, a pole composed of two sections, one of said sections being secured to said beam, a clip composed of two pairs of spaced horizontal lugs, said pairs of lugs being disposed in different horizontal and vertical planes, and a body connecting the inner ends of each pair of lugs, said section being secured to one of said pairs of lugs, the other section being secured to the other of said pairs of lugs, a three horse draft evener including three swingle trees, and means to secure said evener to the first named section so that said evener may have vertical and horizontal adjustment with respect to said first named section.

2. In a wheeled structure in combination, a beam, a pole secured thereto and comprising a section secured to the beam, and a second section forwardly projecting therebeyond, a clip connecting the sections and offsetting the second section above and to one side of the first section, said clip having a diagonally extending body portion formed at its lower end with rearwardly extending lugs secured to the first section and at its upper end with forwardly projecting lugs secured to the second section and a three-horse draft evener hung from the first section and including three swingle trees, the second section being adjacent to one end of the central swingle tree.

In testimony whereof I have affixed my signature in presence of two witnesses.

OTTO H. MARX.

Witnesses:
EMIL BEHRENS,
ELFRIEDA BEHRENS.